(12) United States Patent
Jeong et al.

(10) Patent No.: US 11,458,812 B2
(45) Date of Patent: Oct. 4, 2022

(54) HEAT PUMP SYSTEM FOR VEHICLE

(71) Applicants: Hyundai Motor Company, Seoul (KR); Kia Motors Corporation, Seoul (KR)

(72) Inventors: Seong-Bin Jeong, Hwaseong-Si (KR); Tae Hee Kim, Hwaseong-Si (KR); Wan Je Cho, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 163 days.

(21) Appl. No.: 16/854,721

(22) Filed: Apr. 21, 2020

(65) Prior Publication Data
US 2021/0252942 A1   Aug. 19, 2021

(30) Foreign Application Priority Data
Feb. 17, 2020   (KR) .................. 10-2020-0018984

(51) Int. Cl.
*B60H 1/00* (2006.01)
*B60H 1/32* (2006.01)

(52) U.S. Cl.
CPC ..... *B60H 1/00907* (2013.01); *B60H 1/00278* (2013.01); *B60H 1/00921* (2013.01); *B60H 1/3213* (2013.01); *B60H 2001/00928* (2013.01); *B60H 2001/00949* (2013.01); *B60H 2001/3266* (2013.01)

(58) Field of Classification Search
CPC ............... B60H 1/034; B60H 1/00807; B60H 1/00885; B60H 1/00899; B60H 1/143; B60H 1/3204; B60H 2001/00307; B60H 2001/00928; B60H 1/00278; B60H 1/3213; B60H 2001/00949; B60H 1/00392; B60L 1/02; B60L 2270/46; B60L 50/50; Y02T 10/70
See application file for complete search history.

(56) References Cited

U.S. PATENT DOCUMENTS 5,641,016 A * 6/1997 Isaji ................... B60H 1/00921
165/43
8,959,936 B2 * 2/2015 Richter ............. B60H 1/00064
62/93

(Continued)

*Primary Examiner* — Ljiljana V. Ciric
(74) *Attorney, Agent, or Firm* — Morgan, Lewis & Bockius LLP

(57) ABSTRACT

A heat pump system for vehicle may include a first cooling apparatus that includes a first radiator and a first water pump connected by a first coolant line, a second cooling apparatus that includes a second radiator and a second water pump connected by a second coolant line, a battery module provided in a battery coolant line selectively connectable to a second coolant line through a first valve, and a chiller provided in a battery coolant line, connected to a refrigerant line of an air conditioner through a refrigerant connection line, and adjusting coolant temperature by heat-exchanging selectively received coolant with refrigerant, wherein a main heat-exchanger provided is connected to the first and second coolant lines to receive coolant circulating the first and second cooling apparatuses, and is connected to the first and second connection lines through a refrigerant valve to condense or evaporate refrigerant through heat-exchanging with coolant.

19 Claims, 4 Drawing Sheets

(56) References Cited

U.S. PATENT DOCUMENTS

| | | | |
|---|---|---|---|
| 9,016,080 B2* | 4/2015 | Brodie | F28D 20/028 62/239 |
| 9,511,645 B2* | 12/2016 | Johnston | B60H 1/32284 |
| 9,533,544 B2* | 1/2017 | Johnston | B60H 1/00278 |
| 9,623,719 B2* | 4/2017 | Hatakeyama | B60H 1/3208 |
| 9,631,872 B2* | 4/2017 | Lombardo | B60H 1/143 |
| 9,731,576 B2* | 8/2017 | Johnston | B60H 1/00921 |
| 9,731,577 B2* | 8/2017 | Johnston | B60H 1/00921 |
| 9,731,578 B2* | 8/2017 | Johnston | H01M 10/663 |
| 9,758,010 B2* | 9/2017 | Johnston | B60H 1/00385 |
| 9,758,011 B2* | 9/2017 | Johnston | B60H 1/32284 |
| 9,758,012 B2* | 9/2017 | Johnston | B60H 1/00921 |
| 9,819,063 B2* | 11/2017 | Blatchley | B60H 1/00385 |
| 9,827,846 B2* | 11/2017 | Porras | B60K 11/085 |
| 9,950,638 B2* | 4/2018 | Porras | B60L 58/24 |
| 10,076,944 B2* | 9/2018 | Jalilevand | B60L 1/02 |
| 10,118,458 B2* | 11/2018 | Kim | B60H 1/00278 |
| 10,173,491 B2* | 1/2019 | Kim | B60H 1/00007 |
| 10,183,544 B2* | 1/2019 | Kim | F25B 25/005 |
| 10,252,597 B2* | 4/2019 | Wallace | B60L 58/27 |
| 10,336,193 B2* | 7/2019 | Ben Ahmed | B60L 58/27 |
| 10,340,563 B2* | 7/2019 | Blatchley | H01M 10/663 |
| 10,343,487 B2* | 7/2019 | Koberstein | B60H 1/32284 |
| 10,406,886 B2* | 9/2019 | Kim | B60H 1/00278 |
| 10,457,111 B2* | 10/2019 | Gebbie | B60H 1/00278 |
| 10,814,692 B2* | 10/2020 | Kim | B60H 1/32284 |
| 10,889,157 B2* | 1/2021 | Kim | B60H 1/00278 |
| 10,974,566 B2* | 4/2021 | Kim | B60H 1/00278 |
| 10,987,998 B2* | 4/2021 | Kim | B60H 1/00885 |
| 11,021,041 B2* | 6/2021 | He | B60H 1/00507 |
| 11,155,138 B2* | 10/2021 | Kim | B60H 1/00921 |
| 11,318,814 B2* | 5/2022 | Maeda | B60K 6/40 |
| 11,318,816 B2* | 5/2022 | Kim | B60H 1/32281 |
| 11,325,443 B2* | 5/2022 | Kim | B60H 1/00921 |
| 11,325,444 B2* | 5/2022 | Kim | B60H 1/00907 |
| 11,342,603 B2* | 5/2022 | Tomai | B60L 58/25 |
| 11,351,838 B2* | 6/2022 | Kim | H01M 10/613 |
| 11,358,435 B2* | 6/2022 | Kim | B60H 1/00278 |
| 11,364,769 B2* | 6/2022 | Bellino | B60H 1/00485 |
| 11,370,265 B2* | 6/2022 | Lee | B60H 1/3228 |
| 11,376,921 B2* | 7/2022 | Kim | B60H 1/32284 |
| 11,383,577 B2* | 7/2022 | Lee | B60R 16/04 |
| 2009/0249807 A1* | 10/2009 | Nemesh | B60H 1/00278 62/117 |
| 2010/0012295 A1* | 1/2010 | Nemesh | H01M 10/6568 165/104.19 |
| 2011/0174000 A1* | 7/2011 | Richter | B60H 1/00064 62/93 |
| 2011/0296855 A1* | 12/2011 | Johnston | B60L 1/02 62/160 |
| 2012/0180997 A1* | 7/2012 | Johnston | B60H 1/00278 165/104.32 |
| 2012/0183815 A1* | 7/2012 | Johnston | B60L 58/27 429/50 |
| 2012/0234518 A1* | 9/2012 | Brodie | F28D 20/028 165/104.31 |
| 2012/0318012 A1* | 12/2012 | Choi | B60H 1/143 62/238.7 |
| 2013/0269911 A1* | 10/2013 | Carpenter | B60H 1/004 165/104.19 |
| 2014/0338376 A1* | 11/2014 | Carpenter | B60L 50/51 62/115 |
| 2015/0129161 A1* | 5/2015 | Nishikawa | B60H 1/00885 62/243 |
| 2015/0202986 A1* | 7/2015 | Hatakeyama | B60H 1/00278 165/287 |
| 2015/0217622 A1* | 8/2015 | Enomoto | B60H 1/00385 62/244 |
| 2015/0217623 A1* | 8/2015 | Hatakeyama | B60L 1/02 429/62 |
| 2015/0258875 A1* | 9/2015 | Enomoto | B60L 58/24 165/104.31 |
| 2015/0308719 A1* | 10/2015 | Gebbie | B60H 1/00921 62/324.1 |
| 2016/0031340 A1* | 2/2016 | Porras | H01M 10/625 429/62 |
| 2016/0107501 A1* | 4/2016 | Johnston | B60H 1/00278 165/41 |
| 2016/0107502 A1* | 4/2016 | Johnston | B60H 1/00921 165/202 |
| 2016/0107503 A1* | 4/2016 | Johnston | B60H 1/00278 165/202 |
| 2016/0107504 A1* | 4/2016 | Johnston | B60H 1/32284 165/202 |
| 2016/0107505 A1* | 4/2016 | Johnston | B60H 1/00278 165/202 |
| 2016/0107506 A1* | 4/2016 | Johnston | B60H 1/00278 165/202 |
| 2016/0107507 A1* | 4/2016 | Johnston | B60H 1/00278 62/160 |
| 2016/0107508 A1* | 4/2016 | Johnston | B60H 1/00278 237/12.3 A |
| 2016/0221413 A1* | 8/2016 | Gebbie | B60H 1/00921 |
| 2016/0318373 A1* | 11/2016 | Kang | F25B 29/003 |
| 2016/0339767 A1* | 11/2016 | Enomoto | F25B 29/003 |
| 2017/0008407 A1* | 1/2017 | Porras | B60L 58/27 |
| 2017/0054188 A1* | 2/2017 | Blatchley | H01M 10/663 |
| 2017/0158081 A1* | 6/2017 | Kim | B60H 1/00278 |
| 2017/0197488 A1* | 7/2017 | Kim | H01M 10/625 |
| 2017/0217279 A1* | 8/2017 | Jalilevand | B60H 1/00885 |
| 2017/0240024 A1* | 8/2017 | Blatchley | B60H 1/00921 |
| 2017/0267063 A1* | 9/2017 | Shan | F25B 5/02 |
| 2017/0361676 A1* | 12/2017 | Androulakis | B60N 2/5685 |
| 2017/0361677 A1* | 12/2017 | Kim | H01M 10/613 |
| 2018/0001784 A1* | 1/2018 | Porras | B60L 58/26 |
| 2018/0050605 A1* | 2/2018 | Lewis | B60K 11/02 |
| 2018/0072130 A1* | 3/2018 | Kim | B60H 1/32281 |
| 2018/0117985 A1* | 5/2018 | Kim | B60H 3/024 |
| 2018/0117986 A1* | 5/2018 | Kim | B60K 1/04 |
| 2018/0208014 A1* | 7/2018 | Ben Ahmed | B60H 1/3211 |
| 2018/0208061 A1* | 7/2018 | Ben Ahmed | B60L 58/26 |
| 2018/0264913 A1* | 9/2018 | Enomoto | B60H 1/32284 |
| 2018/0281562 A1* | 10/2018 | Spies | B60H 1/00899 |
| 2018/0312035 A1* | 11/2018 | Koberstein | B60H 1/00899 |
| 2018/0339574 A1* | 11/2018 | Sugimura | B60H 1/323 |
| 2018/0361828 A1* | 12/2018 | Kato | F25B 49/02 |
| 2019/0039434 A1* | 2/2019 | Wallace | B60W 10/30 |
| 2019/0061470 A1* | 2/2019 | Koberstein | B60H 1/00392 |
| 2019/0135071 A1* | 5/2019 | Hwang | B60H 1/00571 |
| 2019/0135075 A1* | 5/2019 | Hwang | F25B 41/20 |
| 2019/0225050 A1* | 7/2019 | Kang | B60H 1/00335 |
| 2019/0225051 A1* | 7/2019 | Zenner | B60H 1/00835 |
| 2019/0225052 A1* | 7/2019 | Zenner | B60H 1/00835 |
| 2019/0273294 A1* | 9/2019 | Blatchley | H01M 10/635 |
| 2019/0299791 A1* | 10/2019 | Gonze | B60L 1/003 |
| 2019/0315194 A1* | 10/2019 | Kim | B60H 1/00885 |
| 2022/0161630 A1* | 5/2022 | Lindquist | B60H 1/00278 |
| 2022/0176774 A1* | 6/2022 | Tang | B60K 1/00 |
| 2022/0185061 A1* | 6/2022 | Kim | H01M 10/6568 |
| 2022/0185067 A1* | 6/2022 | Kim | B60H 1/00278 |
| 2022/0212517 A1* | 7/2022 | Yu | B60H 1/00278 |

* cited by examiner

HEAT PUMP SYSTEM FOR VEHICLE

CROSS-REFERENCE TO RELATED APPLICATION

The present application claims priority to Korean Patent Application No. 10-2020-0018984 filed on Feb. 17, 2020, the entire contents of which is incorporated herein for all purposes by this reference.

BACKGROUND OF THE INVENTION

Field of the Invention

The present invention relates to a heat pump system for a vehicle.

Description of Related Art

An air conditioner system for a vehicle includes an air conditioner for circulating a refrigerant to heat or cool an interior of the vehicle.

The air conditioner, which can maintain a fresh indoor condition by maintaining an indoor temperature of a vehicle at an appropriate temperature regardless of an external temperature change, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator.

That is, in the air conditioner, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concerns about energy efficiency and environmental pollution have gradually increased, development of an environmentally friendly vehicle capable of being substantially substituted for a vehicle having an internal combustion engine has been required, and the environmentally friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally friendly vehicles, a separate heater is not used, unlike a general vehicle that utilizes an air conditioner, and an air conditioner which is applied to the environmentally friendly vehicle is typically referred to as a heat pump system.

In a case of the electric vehicle using the fuel cell, chemical reaction energy of oxygen and hydrogen is converted into electrical energy to generate driving force, and during the present process, thermal energy is generated by chemical reaction in the fuel cell, and as a result, effective removal of the generated heat is required to secure the performance of the fuel cell.

Even in the hybrid vehicle, the driving force is generated by driving the motor by use of electricity supplied from the fuel cell or the electric battery together with the engine which is actuated with a general fuel, and as a result, the performance of the motor may be secured only by effectively removing the heat generated from the fuel cell or the battery, and the motor.

Accordingly, in a hybrid vehicle or electric vehicle of a related art, a battery cooling system, a cooling portion, and a heat pump system may be configured to have respective separate circuits to prevent heat generation of a motor, electrical equipment, and a battery including a fuel cell.

Thus, the size and weight of a cooling module mounted in the front of the vehicle are increased, and a layout of connection pipes for supplying a refrigerant or coolant to the heat pump system, the cooling apparatus, and the battery cooling system, in an engine compartment becomes complicated.

Furthermore, since a battery cooling system for heating and cooling the battery depending on a vehicle state is separately provided to enable the battery to output optimal performance, a plurality of valves for connection pipes are employed, and thereby ride comfort may deteriorate since noise and vibration due to frequent opening and closing operation may be transmitted to an interior of the vehicle.

Furthermore, conventionally, evaporator and condenser for condensing and evaporating the refrigerant may be separately configured, and there is also a drawback in which the entire constituent elements and weight are increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle having advantages of employing a single heat-exchanger that condenses or evaporates a refrigerant through heat-exchange with a coolant depending on a cooling mode or a heating mode of a vehicle, reducing entire constituent elements and weight.

An exemplary heat pump system for a vehicle includes a first cooling apparatus that includes a first radiator and a first water pump connected to each other by a first coolant line and is configured to circulate a coolant through the first coolant line to cool at least one electrical component and at least one motor, a second cooling apparatus that includes a second radiator and a second water pump connected to each other by a second coolant line and is configured to circulate the coolant through the second coolant line, a battery module provided in a battery coolant line selectively fluidically-connectable to the second coolant line through a first valve, and a chiller provided in the battery coolant line to allow the coolant to pass through an interior, connected to a refrigerant line of an air conditioner through a refrigerant connection line, and configured to adjust a coolant temperature by heat-exchanging a selectively received coolant with refrigerant supplied from the air conditioner, wherein a main heat-exchanger provided in the air conditioner is connected to the first and second coolant lines to receive the coolant circulating the first and second cooling apparatuses, and wherein the main heat-exchanger is connected to first and second connection lines connected to the refrigerant line through a refrigerant valve to condense or evaporate the refrigerant through heat-exchanging with the coolant supplied through the first and second coolant lines such that a flow direction of the refrigerant is changed depending on a mode of a vehicle.

The air conditioner may include a heating ventilation, and air conditioning (HVAC) module including a door which is connected to the refrigerant line, and adjusts an ambient air having passed through an evaporator to selectively flow into an internal condenser depending on cooling, heating, and dehumidification modes of a vehicle, a compressor connected to the refrigerant line between the evaporator and the internal condenser, a first expansion valve provided in the refrigerant line connecting the main heat-exchanger and the evaporator, a second expansion valve provided in the refrigerant connection line, a first bypass line connecting the main heat-exchanger and the compressor through the refrigerant valve such that the refrigerant having passed through the main heat-exchanger selectively flows into the compressor, a third expansion valve provided in the refrigerant line between the internal condenser and the refrigerant valve, and a second bypass line including a first end portion connected to the refrigerant valve and a second end portion connected to the refrigerant line between the first expansion valve and the evaporator such that the refrigerant having passed through the main heat-exchanger selectively flows into the evaporator.

A first end portion of the first connection line may be connected to the refrigerant valve, and a second end portion of the first connection line may be connected to the main heat-exchanger, at a side of the refrigerant valve.

A first end portion of the second connection line may be connected to the refrigerant valve, and a second end portion of the second connection line may be connected to the refrigerant line connecting the evaporator and the main heat-exchanger, at an opposite side of the refrigerant valve.

A sub-condenser may be provided in the refrigerant line between the main heat-exchanger and the evaporator.

In the case that the main heat-exchanger condenses the refrigerant, the sub-condenser may additionally condense the refrigerant condensed at the main heat-exchanger through heat-exchanging with the ambient air.

The second expansion valve may be operated when the battery module is to be cooled by use of the coolant having exchanged heat with the refrigerant, and the second expansion valve may expand the refrigerant that flows through the refrigerant connection line and supplies the expanded refrigerant to the chiller.

In the heating mode and the heating and dehumidification modes of a vehicle, the third expansion valve may selectively expand the refrigerant supplied from the internal condenser.

The first valve selectively may connect the second coolant line and the battery coolant line between the second radiator and the chiller. The first cooling apparatus may be provided with a first branch line connected to the first coolant line between the first radiator and the first water pump through a second valve provided in the first coolant line between the first radiator and the first water pump. The battery coolant line may be provided with a second branch line connecting the chiller and the battery module through the first valve. The second coolant line may be provided with a third branch line separating the battery coolant line and the second coolant line.

In the cooling mode of a vehicle, in the air conditioner, the refrigerant may circulate through the refrigerant line in a state that the first connection line is open by the operation of the refrigerant valve and the second connection line, and the first and second bypass lines are closed, and the third expansion valve may pass the refrigerant flowing into the refrigerant valve through the refrigerant line without expansion.

In the first and second cooling apparatuses, the coolant cooled at the first and second radiators may be supplied to the main heat-exchanger by the operation of the first and second water pumps, and the main heat-exchanger may condense the refrigerant through heat-exchanging with the coolant.

In the heating mode of a vehicle, in the air conditioner, the second bypass line may be closed in a state that the second connection line and the first bypass line may be open by the operation of the refrigerant valve, the refrigerant line connecting the main heat-exchanger and the evaporator may be closed by the operation of the first expansion valve, the refrigerant having flowed from the internal condenser into the refrigerant valve may pass through the main heat-exchanger through the second connection line, and then flow into the compressor through the first connection line and the first bypass line interconnected by the operation of the refrigerant valve, and the third expansion valve may expand the refrigerant flowing from the refrigerant valve into the main heat-exchanger through the second connection line.

The first and second cooling apparatuses may respectively supply the coolant to the main heat-exchanger by the operation of the first and second water pumps. The main heat-exchanger may evaporate the refrigerant through heat-exchanging with the coolant.

In the heating and dehumidification modes of a vehicle, in the air conditioner, the second connection line, the first bypass line, and the second bypass line may be open by the operation of the refrigerant valve, the refrigerant line connecting the main heat-exchanger and the evaporator may be closed by the operation of the first expansion valve, the refrigerant having flowed from the internal condenser into the refrigerant valve may flow into the main heat-exchanger through the second connection line, a part of the refrigerant of the refrigerant having passed through the main heat-exchanger may flow into the compressor through the first connection line and the first bypass line that are open by the operation of the refrigerant valve, a remaining refrigerant of the refrigerant having passed through the main heat-exchanger may flow into the evaporator through the first connection line and the second bypass line that are open by the operation of the refrigerant valve, and the third expansion valve may expand the refrigerant flowing from the refrigerant valve into the main heat-exchanger through the second connection line.

The first and second cooling apparatuses may respectively supply the coolant to the main heat-exchanger by the operation of the first and second water pumps. The main heat-exchanger may evaporate the refrigerant through heat-exchanging with the coolant.

The second and third expansion valves may be respectively an electronic expansion valve that controls flow movement of the refrigerant and selectively expands the refrigerant.

The refrigerant valve may be connected to the first and second connection lines, the refrigerant line, and the first and second bypass lines, and may be formed as a five-way valve controlling flow movement of the refrigerant.

A receiver dryer may be mounted on the main heat-exchanger on the opposite side of the refrigerant valve. The receiver dryer may separate gaseous refrigerant contained in the refrigerant having passed through the main heat-exchanger, or the refrigerant flowing into the main heat-exchanger through the second connection line.

The electrical component may include at least one inverter and an on-board charger (OBC), and The at least one motor may include two motors corresponding to front and rear wheels of the vehicle.

Therefore, according to a heat pump system for a vehicle according to an exemplary embodiment a single main heat-exchanger 53 to condense or evaporate the refrigerant through heat-exchanging with the coolant depending on a cooling mode or a heating mode of a vehicle, and therefore, simplification of the system may be enabled.

Furthermore, in the air conditioner, the flow movement the refrigerant may be efficiently controlled by controlling the operation of the refrigerant valve formed as a five-way valve, and therefore, cooling and heating performance of the vehicle interior may be secured.

Furthermore, through the simplification of the entire system, a reduction in production cost and weight is possible, and space utilization may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
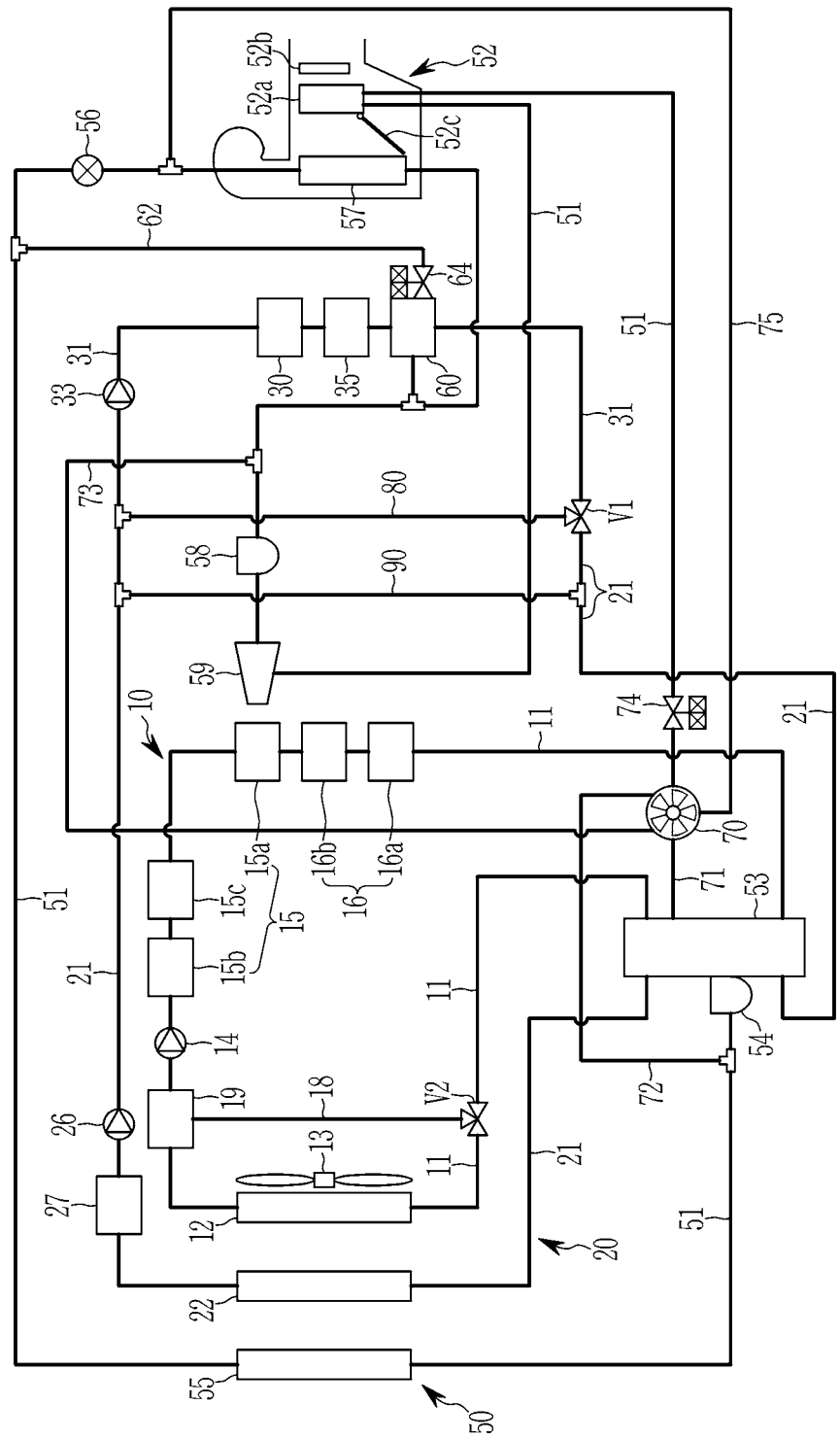
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments disclosed in the present specification and the constructions depicted in the drawings are only the exemplary embodiments of the present invention, and do not cover the entire scope of the present invention. Therefore, it will be understood that there may be various equivalents and variations at the time of the application of the present specification.

To clarify the present invention, parts that are not connected to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Furthermore, unless explicitly described to the contrary, the word "comprise" and variations such as "comprises" or "including", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 is a block diagram of a heat pump system for a vehicle according to an exemplary embodiment of the present invention.

A heat pump system for a vehicle according to an exemplary embodiment employs a single heat-exchanger that condenses or evaporates a refrigerant through heat-exchange with a coolant depending on a cooling mode or a heating mode of a vehicle, reducing entire constituent elements and weight.

Here, in the heat pump system, e.g., in an electric vehicle, a first cooling apparatus 10 for cooling at least one electrical component 15 and at least one motor 16, a second cooling apparatus 20 for cooling a battery module 30, and an air conditioner 50 as an air conditioner apparatus of cooling or heating an interior may cooperate with one another.

That is, referring to FIG. 1, the heat pump system includes the first and second cooling apparatuses 10 and 20, the battery module 30, and a chiller 60.

First, the first cooling apparatus 10 includes a first radiator 12 and a first water pump 14 connected to each other by a first coolant line 11. The first cooling apparatus 10 circulates a coolant through the first coolant line 11 by the operation of the first water pump 14 to cool the electrical component 15 and the motor 16.

The first radiator 12 is mounted forward in a vehicle, and a cooling fan 13 is provided at a rear of the first radiator 12 to cool the coolant through heat-exchange with an ambient air, e.g., by the operation of the cooling fan 13.

Here, the electrical component 15 may include a power control apparatus, or an on-board charger (OBC) 15a, or inverters 15b and 15c. The power control apparatus or the inverters 15b and 15c may generate heat while driving, and the on-board charger 15a may generate heat when charging the battery module 30.

Furthermore, the at least one motor 16 may include front and rear motors 16a and 16b corresponding to front and rear wheels of the vehicle.

Furthermore, the inverters 15b and 15c may be provided in a pair corresponding to the front and rear motors 16a and 16b.

The electrical component 15 and the motor 16 may be mounted in series in the first coolant line 11.

Furthermore, a first reservoir tank 19 is provided in the first coolant line 11 between the first radiator 12 and the first water pump 14. The first reservoir tank 19 may store a coolant cooled at the first radiator 12.

The first cooling apparatus 10 circulates the coolant cooled at the first radiator 12 through the first coolant line 11 by the operation of the first water pump 14, cooling the electrical component 15 and the motor 16 so as not to overheat.

In the exemplary embodiment of the present invention, the second cooling apparatus 20 includes a second radiator 22 and a second water pump 26 connected to each other by a second coolant line 21, and circulates the coolant in the second coolant line 21.

The second cooling apparatus 20 may selectively supply the coolant cooled at the second radiator 22 to the battery module 30.

The second radiator 22 is mounted in front of the first radiator 12 to cool the coolant through heat-exchange with an ambient air, e.g., by the operation of the cooling fan 13.

Furthermore, a second reservoir tank 27 is provided in the second coolant line 21 between the second radiator 22 and the second water pump 26. The second reservoir tank 27 may store a coolant cooled at the second radiator 22.

The second cooling apparatus 20 may circulate the coolant cooled at the second radiator 22 through the second coolant line 21 by the operation of the second water pump 26.

In the exemplary embodiment of the present invention, the battery module 30 is provided in a battery coolant line 31 selectively fluidically-connectable to the second coolant line 21 through a first valve V1.

Here, the first valve V1 may selectively connect the second coolant line 21 and the battery coolant line 31 between the second radiator 22 and the battery module 30.

In more detail, the first valve V1 selectively connects the second coolant line 21 and the battery coolant line 31 between the chiller 60 and the second radiator 22 provided in the battery coolant line 31.

Here, the battery module 30 supplies an electric power to the electrical component 15 and the motor 16, and is formed in water-cooled type which is cooled by a coolant flowing through the battery coolant line 31.

That is, the battery module 30 is selectively fluidically-connectable to the second cooling apparatus 20 through the battery coolant line 31 according to the operation of the first valve V1. Furthermore, the coolant may circulate through the battery module 30 by the operation of a third water pump 33 provided in the battery coolant line 31.

The third water pump 33 is provided between the chiller 60 and the battery module 30 in the battery coolant line 31. The third water pump 33 operates to circulate the coolant through the battery coolant line 31.

Here, the first, the second and third water pumps 14, 26, and 33 may be respectively an electric water pump.

Meanwhile, the first cooling apparatus 10 may be provided with a first branch line 18 connected to the first reservoir tank 19 between the first radiator 12 and the first water pump 14 through a second valve V2 provided in the first coolant line 11 between the first radiator 12 and the first water pump 14.

In more detail, the second valve V2 is provided between the electrical component 15, the motor 16, and the first radiator 12, in the first coolant line 11.

A first end portion of the first branch line 18 may be connected to the first coolant line 11 through the second valve V2, and a second end portion of the first branch line 18 may be connected to the first reservoir tank 19 provided between the first radiator 12 and the first water pump 18.

The first branch line 18 is selectively open by the operation of the second valve V2 when the waste heat generated at the electrical component 15 and the motor 16 is absorbed to increase a coolant temperature. At the instant time, the first coolant line 11 connected to the first radiator 12 is closed by the operation of the second valve V2.

In the exemplary embodiment of the present invention, the chiller 60 is provided in the battery coolant line 31 to allow the coolant to pass through an interior, and connected to a refrigerant line 51 of the air conditioner 50 through a refrigerant connection line 62.

The chiller 60 may adjust the coolant temperature by heat-exchanging the coolant selectively flowing into the interior with the refrigerant supplied from the air conditioner 50. Here, the chiller 60 may be a water-cooled heat-exchanger into which a coolant flows.

Meanwhile, the battery coolant line 31 may be provided with a coolant heater 35 between the battery module 30 and the chiller 60.

When the temperature of the battery module 30 is required to be increased, the coolant heater 35 may be turned on to heat the coolant circulating through the battery coolant line 31, and the coolant of an increased temperature may flow to the battery module 30.

The coolant heater 35 may be an electrical heater that operates according to supplying of electric power.

In the exemplary embodiment of the present invention, the battery coolant line 31 may be provided with a second branch line 80 connecting the battery coolant line 31 between the chiller 60 and the battery module 30 through the first valve V1.

Furthermore, the second coolant line 21 is provided with a third branch line 90 that separates the battery coolant line 31 and the second coolant line 21.

The third branch line 90 may be selectively fluidically-connectable to the second coolant line 21 such that the second cooling apparatus 20 may form an independent closed circuit through the second coolant line 21.

Meanwhile, an additional velvety may be provided at intersection points of the third branch line 90 with the second coolant line 21 and the battery coolant line 31, or in the third branch line 90. Such a valve may be a three-way valve or a two-way valve.

Accordingly, the first valve V1 selectively connects the second coolant line 21 and the battery coolant line 31, or selectively connects the battery coolant line 31 and the second branch line 80, to control flow movement of the coolant.

That is, when the battery module 30 is to be cooled by use of the coolant cooled at the second radiator 22, the first valve V1 may connect the second coolant line 21 connected to the second radiator 22 to the battery coolant line 31, and may close the second branch line 80.

Accordingly, the coolant cooled at the second radiator 22 may flow through the second coolant line 11 and the battery coolant line 31 interconnected by the operation of the first valve V1, and may cool the battery module 30.

Furthermore, when the battery module 30 is to be cooled by use of the coolant having exchanged heat with the refrigerant, the first valve V1 may open the second branch line 80, and close the connection of the second coolant line 21 and the battery coolant line 31.

Accordingly, the coolant of a low temperature having heat-exchanged with the refrigerant at the chiller 60 may flow into the battery module 30 through the second branch line 80 open by the first valve V1, efficiently cooling the battery module 30.

On the other hand, when the temperature of the battery module 30 is to be increased, the coolant circulating through the battery coolant line 31 by the operation of the first valve V1 is prevented from flowing to the second radiator 22, and the coolant heated by the operation of the coolant heater 35 flows to the battery module 30, rapidly increasing the temperature of the battery module 30.

Meanwhile, as a mere example, the exemplary embodiment of the present invention is described that the third branch line 90 is not provided with a valve, however, it is not limited thereto. A valve may also be employed in the third branch line 90 when needed to selectively open the third branch line 90.

That is, a flow control of the circulating coolant is enabled through a selectively connection between the second coolant line 21, the battery coolant line 31, and the second branch line 80 according to modes (heating, cooling, and dehumidification modes) of a vehicle and the operation of the second and third water pumps 26 and 33, and therefore, opening and closing of the third branch line 90 may be controlled.

Meanwhile, in the exemplary embodiment of the present invention, the air conditioner 50 includes a heating, ventilation, and air conditioning (HVAC) module 52, a main heat-exchanger 53, a receiver dryer 54, a first expansion valve 56, an evaporator 57, an accumulator 58, and a compressor 59, which are connected to each other through the refrigerant line 51.

First, the HVAC module 52 is connected to the refrigerant line 51, and includes a door 52c that adjusts the ambient air having passed through the evaporator 57 to selectively flow to an internal condenser 52a and an internal heater 52b according to cooling, heating, and heating/dehumidification modes of a vehicle.

That is, the door 52c is open in the heating mode of a vehicle such that the ambient air having passed through the evaporator 57 may flow to the internal condenser 52a and the internal heater 52b.

To the contrary, in the cooling mode of a vehicle, the door 52c closes the internal condenser 52a and the internal heater 52b such that the ambient air cooled while passing through the evaporator 57 may directly flow into the vehicle.

The main heat-exchanger 53 is connected to the refrigerant line 51 to receive the refrigerant, and also connected to the first and second coolant lines 11 and 21 to receive the coolant circulating the first and second cooling apparatuses 10 and 20, respectively.

The main heat-exchanger 53 may condense or evaporate the refrigerant through the heat-exchange with the coolant supplied through the first and second coolant lines 11 and 21, depending on the mode of a vehicle. That is, the main heat-exchanger 53 may be a water-cooled heat-exchanger into which a coolant flows.

Here, the main heat-exchanger 53 may be respectively connected to first and second connection lines 71 and 72 connected to the refrigerant line 51 through a refrigerant valve 70, such that the flow direction of the refrigerant may be changed to condense or evaporate the refrigerant depending on the mode of a vehicle.

Therefore, the refrigerant passing through the main heat-exchanger 53 may exchange heat with the coolant supplied through the first coolant line 11, and the coolant supplied through the second coolant line 21.

Meanwhile, a first end portion of the first connection line 71 may be connected to the refrigerant valve 70, and a second end portion of the first connection line 71 may be connected to the main heat-exchanger 53 at a side of the refrigerant valve 70.

Furthermore, a first end portion of the second connection line 72 may be connected to the refrigerant valve 70, and a second end portion of the second connection line 72 may be connected to the refrigerant line 51 connecting the evaporator 57 and the main heat-exchanger 53, at an opposite side of the refrigerant valve 70.

The main heat-exchanger 53 may heat-exchange the refrigerant supplied from the compressor 59 through the internal condenser 52a with the coolant supplied from the first cooling apparatus 10, and may additionally heat-exchange the coolant and the refrigerant supplied from the second cooling apparatus 20.

By such an operation, the main heat-exchanger 53 may further decrease the refrigerant temperature, and increase an amount of condensation or evaporation.

In the exemplary embodiment of the present invention, the receiver dryer 54 is mounted on the main heat-exchanger 53 at an opposite side of the refrigerant valve 70.

The receiver dryer 54 may separate gaseous refrigerant contained in the refrigerant having passed through the main heat-exchanger 53, or in the refrigerant flowing into the main heat-exchanger 53 through the second connection line 72.

Here, the receiver dryer 54 may be integrally mounted on the main heat-exchanger 53.

Meanwhile, a sub-condenser 55 to additionally condense the refrigerant having passed through the main heat-exchanger 53 may be provided in the refrigerant line 51 between the main heat-exchanger 53 and the evaporator 57.

The sub-condenser 55 is mounted in front of the second radiator 22, and heat-exchanges the received refrigerant with the ambient air.

Accordingly, in the case that the main heat-exchanger 53 condenses the refrigerant, the sub-condenser 55 further condenses the refrigerant condensed at the main heat-exchanger 53, increasing sub-cooling of the refrigerant, and the coefficient of performance (COP), which is a coefficient of cooling capacity compared to the required power of the compressor, may be improved.

In the exemplary embodiment of the present invention, the first expansion valve 56 is provided in the refrigerant line 51 connecting the sub-condenser 55 and the evaporator 57. The first expansion valve 56 is supplied with the refrigerant having passed through the sub-condenser 55, and expands the received refrigerant. The first expansion valve 56 may be a mechanical expansion valve.

The compressor 59 is connected to the refrigerant line 51 between the evaporator 57 and the main heat-exchanger 53. The compressor 59 compresses the refrigerant in the gaseous state and may supply the compressed refrigerant to the internal condenser 52a.

Meanwhile, the accumulator 58 is provided in the refrigerant line 51 between the evaporator 57 and the compressor 59.

The accumulator 58 improves the efficiency and durability of the compressor 59 by supplying only the gaseous state refrigerant to the compressor 59.

The air conditioner 50 configured as described above may further include a second expansion valve 64, a first bypass line 73, a third expansion valve 74, and a second bypass line 75.

First, the second expansion valve 64 is provided in the refrigerant connection line 62 between the sub-condenser 55 and the chiller 60.

Here, the second expansion valve 64 is operated when the battery module 30 is to be cooled by use of the coolant having exchanged heat with the refrigerant. The second expansion valve 64 may expand the refrigerant that flows through the refrigerant connection line 62 and may supply the expanded refrigerant to the chiller 60.

That is, the second expansion valve 64 expands the condensed refrigerant discharged from the sub-condenser 55 and supplies the refrigerant with a lowered temperature to the chiller 60, further decreasing the coolant temperature passing through the chiller 60.

Accordingly, the battery module 30 receives a coolant of a lowered temperature by passing through the chiller 60, achieving further efficient cooling.

In the exemplary embodiment of the present invention, the first bypass line 73 may connect the main heat-exchanger 53 and the compressor 59 through the refrigerant valve 70 such that the refrigerant having passed through the main heat-exchanger 53 may selectively flow into the compressor 59.

The third expansion valve 74 may be provided in the refrigerant line 51 between the internal condenser 52a and the main heat-exchanger 53.

In the heating mode of a vehicle and the heating and dehumidification mode, the third expansion valve 74 may selectively expand the refrigerant flowing from the internal condenser 52a into the main heat-exchanger 53.

Furthermore, a first end portion of the second bypass line 75 may be connected to the refrigerant valve 70, and a second end portion of the second bypass line 75 may be connected to the refrigerant line 51 between the first expansion valve 56 and the evaporator 57, such that the refrigerant having passed through the main heat-exchanger 53 may selectively flow into the evaporator 57.

Here, the refrigerant valve 70 is connected to the first and second connection lines 71 and 72, the refrigerant line 51, and the first and second bypass lines 73 and 75, and may be a five-way valve controlling flow movement of the refrigerant.

Furthermore, the second expansion valve 64 and the third expansion valve 74 may be an electronic expansion valve that controls flow movement of the refrigerant and selectively expands the refrigerant.

Furthermore, the first and second valves V1 and V2 may be three-way valves configured for distributing flow.

Hereinafter, an operation of a heat pump system for a vehicle according to an exemplary embodiment of the present invention is described in detail with reference to FIG. 2, FIG. 3 and FIG. 4.

First, an operation in the cooling mode of a vehicle in a heat pump system for a vehicle according to an exemplary embodiment of the present invention is described with reference to FIG. 2.

Figure 2:
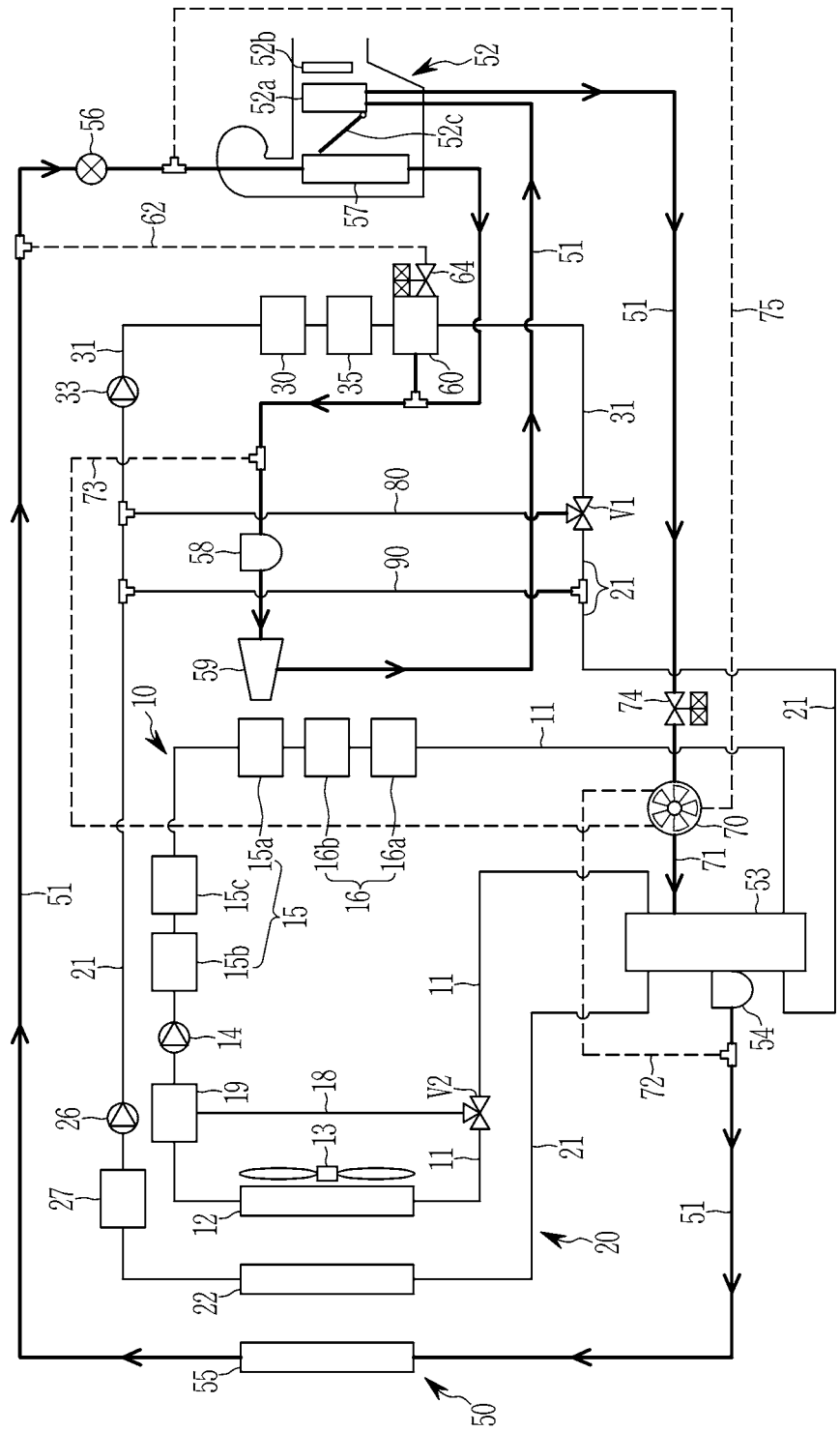
FIG. 2 illustrates an operation state in a cooling mode of a vehicle of a heat pump system for a vehicle according to an exemplary embodiment of the present invention.

FIG. 2 illustrates an operation state in the cooling mode of a vehicle of a heat pump system for a vehicle according to an exemplary embodiment of the present invention.

Referring to FIG. 2, in the cooling mode of a vehicle, in the air conditioner 50, the refrigerant circulates through the refrigerant line 51 by cooperative operation of constituent elements to cool the vehicle interior.

Here, in the air conditioner 50, the first connection line 71 is open by the operation of the refrigerant valve 70.

Simultaneously, in a state that the second connection line 72 and the first and second bypass lines 73 and 75 are closed, the refrigerant circulates through the refrigerant line 51.

Furthermore, the refrigerant connection line 62 is closed by the operation of the second expansion valve 64.

Here, the third expansion valve 74 may pass the refrigerant flowing into the refrigerant valve 70 through the refrigerant line 51 without expansion.

Meanwhile, in the first and second cooling apparatuses 10 and 20, the coolant cooled at the first and second radiators 12 and 22 may be supplied to the main heat-exchanger 53 by the operation of the first and second water pumps 14 and 26.

Accordingly, the main heat-exchanger 53 may condense the refrigerant through heat-exchanging with the coolant.

That is, the main heat-exchanger 53 condenses the refrigerant received through the first connection line 71 by use of the coolant flowing through the first and second coolant lines 11 and 21.

The gaseous refrigerant contained in the refrigerant condensed at the main heat-exchanger 53 is separated while passing through the receiver dryer 54. The liquid refrigerant having passed through the receiver dryer 54 is supplied to the sub-condenser 55 through the refrigerant line 51.

The refrigerant further condensed while passing through the sub-condenser 56 flows through the refrigerant line 51 to cool the vehicle interior, and consecutively passes through the first expansion valve 56, the evaporator 57, the accumulator 58, the compressor 59, the internal condenser 52a, and the main heat-exchanger 53.

Here, the ambient air flowing into the HVAC module 52 is cooled while passing through the evaporator 57 by the refrigerant of a low temperature having flowed into the evaporator 57.

At the present time, the door 52c closes a portion toward the internal condenser 52a such that the cooled ambient air is prevented from passing through the internal condenser 52a and the internal heater 52b. Therefore, the cooled ambient air directly flows into the vehicle interior to cool the vehicle interior.

Meanwhile, the evaporator 57 is supplied with the refrigerant further condensed while consecutively pass through the main heat-exchanger 53 and the sub-condenser 55, and therefore, the refrigerant may be evaporated to a further lower temperature.

That is, in the exemplary embodiment of the present invention, the main heat-exchanger 53 primarily condenses the refrigerant, and the sub-condenser 55 additionally condenses the refrigerant. Therefore, formation of sub-cooling of the refrigerant may be facilitated.

Furthermore, since the refrigerant formed with the sub-cooling is evaporated to a further lower temperature at the evaporator 57, the temperature of the coolant heat-exchanging at the evaporator 57 may be further decreased, improving cooling performance and efficiency.

That is, refrigerant may cool the internal in the cooling mode of a vehicle while repeating the above-described process.

Meanwhile, although not shown in the drawings, in the cooling mode of a vehicle, when the battery module 30 is to be cooled by use of the refrigerant, the refrigerant connection line 62 may be open by the operation of the second expansion valve 64.

Accordingly, the chiller 60 receives the refrigerant expanded while passing through the second expansion valve 64. Accordingly, the coolant circulating through the battery coolant line 31 may be cooled by heat-exchanging with the refrigerant while passing through the chiller 60.

The coolant cooled at the chiller 60 flows through the battery coolant line 31 to flow into the battery module 30. Accordingly, the battery module 30 may be efficiently cooled by the coolant of a low temperature supplied through the battery coolant line 31.

In the exemplary embodiment of the present invention, an operation in the heating mode of a vehicle is described with reference to FIG. 3.

Figure 3:
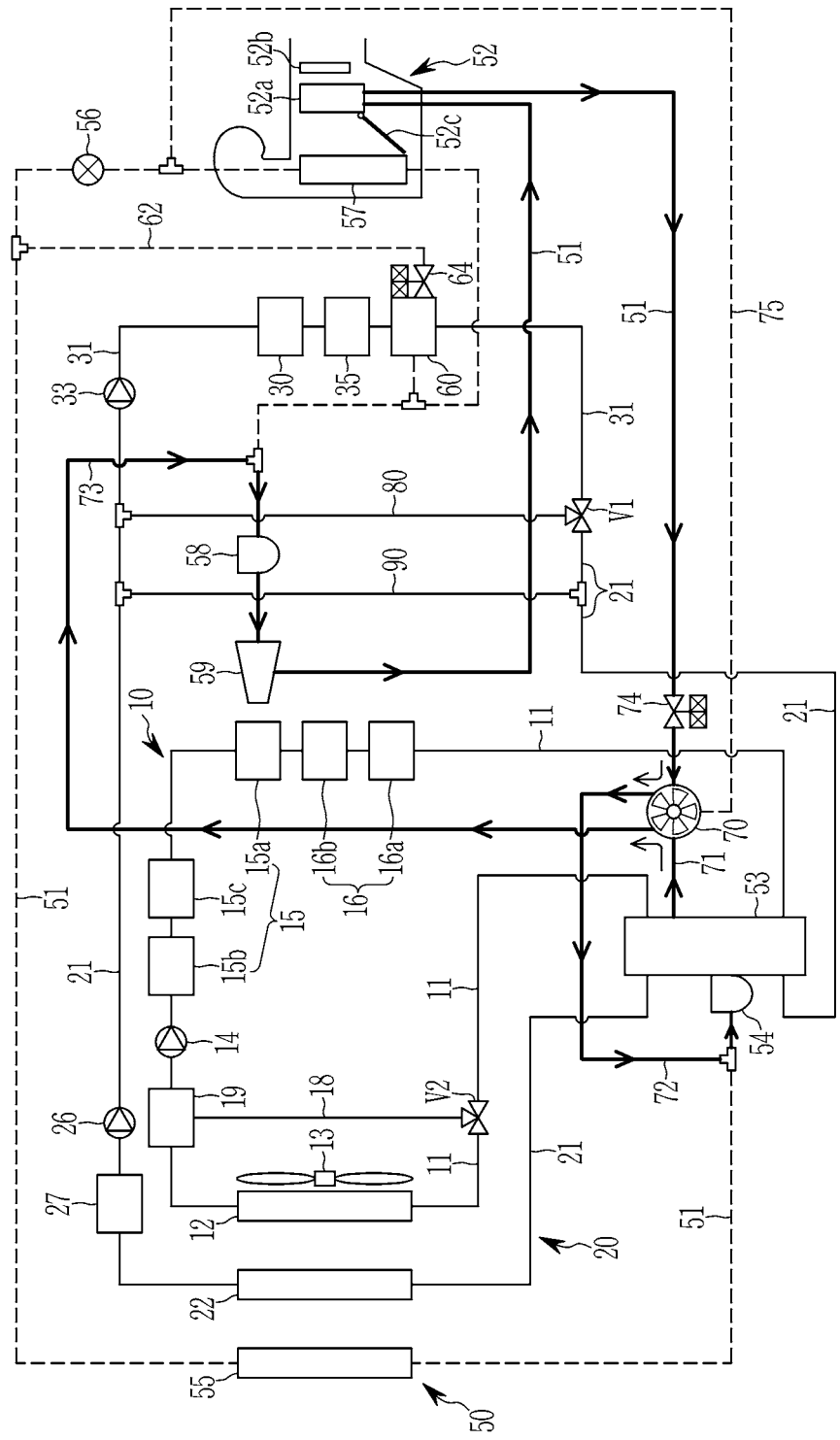
FIG. 3 illustrates an operation state in a heating mode of a vehicle of a heat pump system for a vehicle according to an exemplary embodiment of the present invention.

FIG. 3 illustrates an operation state in the heating mode of a vehicle of a heat pump system for a vehicle according to an exemplary embodiment of the present invention.

Referring to FIG. 3, in the heating mode of a vehicle, in the air conditioner 50, the refrigerant circulates through the refrigerant line 51 to heat the vehicle interior by cooperative operation of constituent elements.

Here, in the air conditioner 50, in a state that the second connection line 72 and the first bypass line 73 are open by the operation of the refrigerant valve 70, the second bypass line 75 is closed.

Furthermore, by the operation of the first expansion valve 56, the refrigerant line 51 connecting the main heat-exchanger 53 and the evaporator 57 is closed.

Accordingly, the refrigerant having flowed from the internal condenser 52a into the refrigerant valve 70 passes through the main heat-exchanger 53 through the second connection line 72, and then flows into the compressor 59 through the first connection line 71 and the first bypass line 73 interconnected by the operation of the refrigerant valve 70.

Here, the third expansion valve 74 may expand the refrigerant flowing from the refrigerant valve 70 into the main heat-exchanger 53 through the second connection line 72.

Meanwhile, the first and second cooling apparatuses 10 and 20 may supply the coolant to the main heat-exchanger 53 by the operation of the first and second water pumps 14 and 26.

Accordingly, the main heat-exchanger 53 may evaporate the refrigerant through heat-exchanging with the coolant.

That is, the main heat-exchanger 53 evaporates the refrigerant received through the second connection line 72 by use of the coolant flowing through the first and second coolant lines 11 and 21.

The refrigerant evaporated while passing through the main heat-exchanger 53 is supplied to the accumulator 58 through the first connection line 71 and the first bypass line 73 interconnected by the operation of the refrigerant valve 70.

The refrigerant supplied to the accumulator 58 is separated into gas and liquid, and among refrigerants separated into gas and liquid, the gaseous refrigerant is supplied to the compressor 59.

The refrigerant compressed to a state of a high temperature and a high pressure at the compressor 59 flows into the internal condenser 52a.

Here, the door 52c is open such that the ambient air having flowed into the HVAC module 52 and having passed through the evaporator 57 may pass through the internal condenser 52a.

Accordingly, the ambient air flowing from an external passes through the evaporator 57 without being supplied with the refrigerant, and flows into the vehicle interior at a room temperature without having been cooled. The inflowing ambient air is converted to a high temperature while passing through the internal condenser 52a, and flows into the vehicle interior by passing through the internal heater 52b which is selectively operated, to achieve heating of the vehicle interior.

Meanwhile, although not shown in the drawings, the waste heat of the electrical component 15 and the motor 16 is to be recollected in the heating mode of a vehicle, the second valve V2 may open the first branch line 18, and close the first coolant line 11 connecting the electrical component 15, the motor 16, and the first radiator 12.

Accordingly, the coolant having passed through the electrical component 15 and the motor 16 maintains circulating through the first coolant line 11 without passing through the first radiator 12, and absorbs the waste heat from the electrical component 15 and the motor 16, increasing the coolant temperature.

The coolant of the increased temperature may be supplied to the main heat-exchanger 53.

That is, the waste heat generated at the electrical component 15 and the motor 16 increases the temperature of the coolant circulating the first coolant line 11.

Accordingly, the coolant having a temperature increased at the first cooling apparatus 10 may increase the temperature of the refrigerant discharged from the main heat-exchanger 53 while passing through the main heat-exchanger 53 by the operation of the first water pump 14, and thereby the waste heat may be recollected.

In more detail, the main heat-exchanger 53 may evaporate the refrigerant by use of the coolant that flows through the first and second coolant lines 11 and 21 and recollects the waste heat of the electrical component 15 and the motor 16 to have an increased temperature.

That is, according to a heat pump system according to the exemplary embodiment of the present invention, when heating of the vehicle is required, the waste heat generated at the electrical component 15 and the motor 16 is absorbed and used to increase the refrigerant temperature, and therefore, power consumption of the compressor 59 may be reduced and heating efficiency may be improved.

In the exemplary embodiment of the present invention, an operation in the heating and dehumidification modes of a vehicle is described with reference to FIG. 4.

Figure 4:
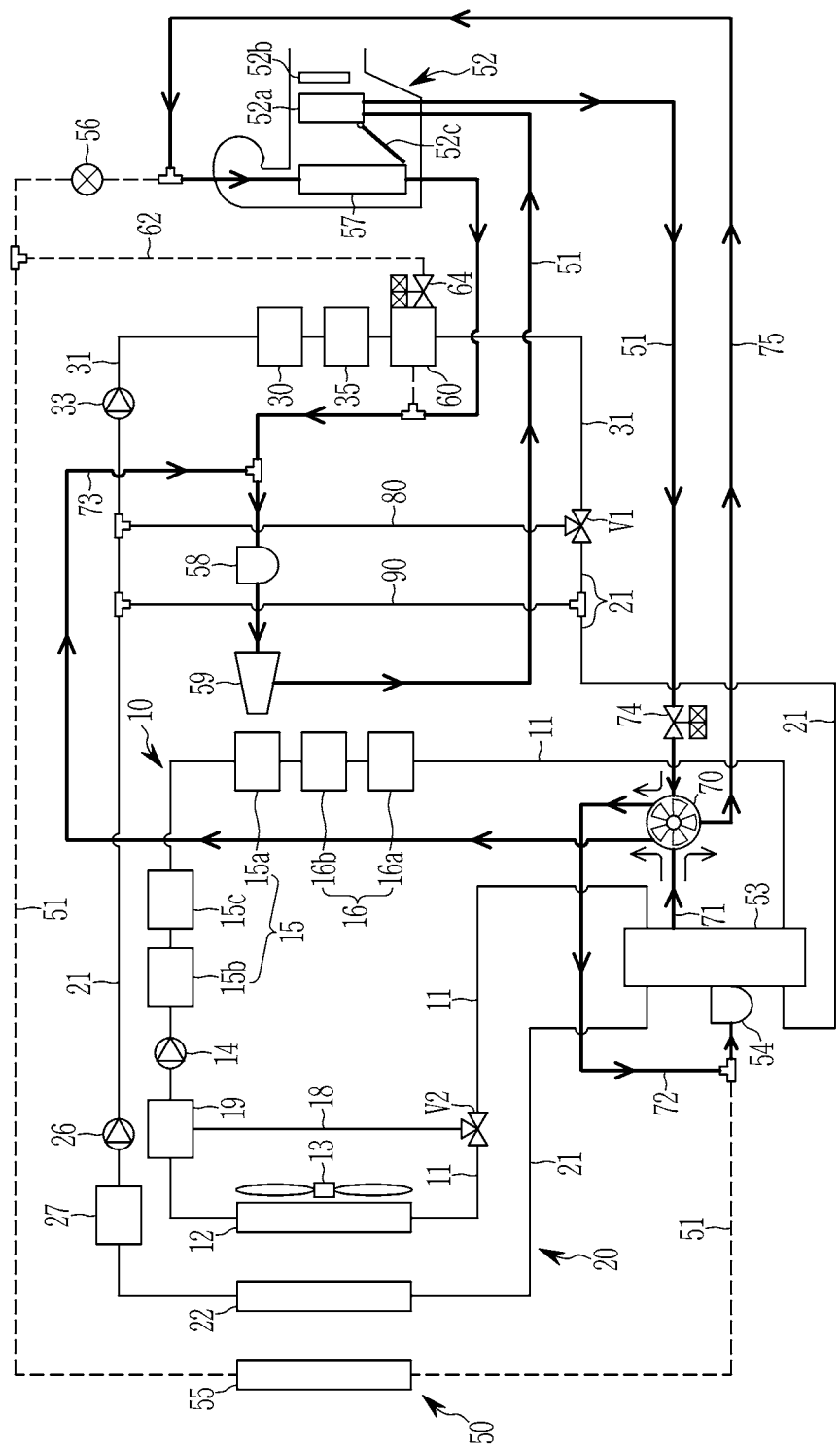
FIG. 4 illustrates an operation state in a heating and dehumidification mode of a heat pump system for a vehicle according to an exemplary embodiment of the present invention.

FIG. 4 illustrates an operation state in a heating and dehumidification mode of a heat pump system for a vehicle according to an exemplary embodiment of the present invention.

Referring to FIG. 4, in the cooling mode of a vehicle, in the air conditioner 50, the refrigerant circulates through the refrigerant line 51 to cool the vehicle interior by cooperative operation of constituent elements.

Here, in the air conditioner 50, the second connection line 72, the first bypass line 73, and the second bypass line 75 is opened by the operation of the refrigerant valve 70.

Furthermore, by the operation of the first expansion valve 56, the refrigerant line 51 connecting the main heat-exchanger 53 and the evaporator 57 is closed.

Accordingly, the refrigerant having flowed from the internal condenser 52a into the refrigerant valve 70 flows into the main heat-exchanger 53 through the second connection line 72.

Here, a part of the refrigerant of the refrigerant having passed through the main heat-exchanger 53 flows into the compressor 59 through the first connection line 71 and the first bypass line 73 that are open by the operation of the refrigerant valve 70.

Furthermore, a remaining refrigerant of the refrigerant having passed through the main heat-exchanger 53 flows into the evaporator 57 through the first connection line 71 and the second bypass line 75 that are open by the operation of the refrigerant valve 70.

Here, the third expansion valve 74 may expand the refrigerant flowing from the refrigerant valve 70 into the main heat-exchanger 53 through the second connection line 72.

Meanwhile, the first and second cooling apparatuses 10 and 20 may supply the coolant to the main heat-exchanger 53 by the operation of the first and second water pumps 14 and 26.

Accordingly, the main heat-exchanger 53 may evaporate the refrigerant through heat-exchanging with the coolant.

That is, the main heat-exchanger 53 evaporates the refrigerant received through the second connection line 72 by use of the coolant flowing through the first and second coolant lines 11 and 21.

The partial refrigerant of the refrigerant evaporated while passing through the main heat-exchanger 53 is supplied to the accumulator 58 through the first connection line 71 and the first bypass line 73 interconnected by the operation of the refrigerant valve 70.

The refrigerant supplied to the accumulator 58 is separated into gas and liquid, and among refrigerants separated into gas and liquid, the gaseous refrigerant is supplied to the compressor 59.

The refrigerant compressed to a state of a high temperature and a high pressure at the compressor 59 flows into the internal condenser 52a.

Meanwhile, the evaporated refrigerant supplied to the evaporator 57 through the second bypass line 75 heat-exchange with the ambient air passing through the evaporator 57, and then passes through the accumulator 58 to be supplied to the compressor 59 through the refrigerant line 51.

That is, the refrigerant having passed through the evaporator 57 may pass through the accumulator 58 to be supplied to the compressor 59, together with the refrigerant having flowed into the first bypass line 73.

Furthermore, the refrigerant compressed to a state of a high temperature and a high pressure at the compressor 59 flows into the internal condenser 52a.

Here, the door 52c is opened such that the ambient air having flowed into the HVAC module 52 and having passed through the evaporator 57 may pass through the internal condenser 52a.

That is, the ambient air flowing into the HVAC module 52 is dehumidified by the refrigerant of a low temperature having flowed into the evaporator 57 while passing through the evaporator 57. Accordingly, the inflowing ambient air is converted to a high temperature while passing through the internal condenser 52a, and flows into the vehicle interior by passing through the internal heater 52b which is selectively operated, to achieve heating and dehumidification of the vehicle interior.

Furthermore, a part of the refrigerant of the refrigerant evaporated while passing through the main heat-exchanger 53 may be supplied to the evaporator 57 through the second bypass line 75, and thereby the internal dehumidification may be achieved without the operation of the first expansion valve 56.

Meanwhile, although not shown in the drawings, in the heating and dehumidification modes of a vehicle, when the waste heat of the electrical component 15 and the motor 16 is to be recollected, the second valve V2 may open the first branch line 18, and close the first coolant line 11 connecting the electrical component 15, the motor 16, and the first radiator 12.

Accordingly, the coolant having passed through the electrical component 15 and the motor 16 maintains circulating through the first coolant line 11 without passing through the first radiator 12, and absorbs the waste heat from the electrical component 15 and the motor 16, increasing the coolant temperature.

The coolant of an increased temperature may be supplied to the main heat-exchanger 53.

That is, the waste heat generated at the electrical component 15 and the motor 16 increases the temperature of the coolant circulating the first coolant line 11.

Accordingly, the coolant having a temperature increased at the first cooling apparatus 10 may increase the temperature of the refrigerant discharged from the main heat-exchanger 53 while passing through the main heat-exchanger 53 by the operation of the first water pump 14, and thereby the waste heat may be recollected.

In more detail, the main heat-exchanger 53 may evaporate the refrigerant by use of the coolant that flows through the first and second coolant lines 11 and 21 and recollects the waste heat of the electrical component 15 and the motor 16 to have an increased temperature.

That is, according to a heat pump system according to the exemplary embodiment of the present invention, in the heating and dehumidification modes of a vehicle, the waste heat generated at the electrical component 15 and the motor 16 is used to increase the refrigerant temperature, and therefore, power consumption of the compressor 59 may be reduced and heating efficiency may be improved.

Therefore, according to a heat pump system for a vehicle according to an exemplary embodiment a single main heat-exchanger 53 to condense or evaporate the refrigerant through heat-exchanging with the coolant depending on a cooling mode or a heating mode of a vehicle, and therefore, simplification of the system may be enabled.

Furthermore, in the air conditioner 50, the flow movement the refrigerant may be efficiently controlled by controlling the operation of the refrigerant valve 70 formed as a five-way valve, and therefore, cooling and heating performance of the vehicle interior may be secured.

Furthermore, in the heating mode and the heating and dehumidification modes of a vehicle, the waste heat of the electrical component 15, the motor 16, and the battery module 30 may be selectively utilized, to improve heating efficiency.

Furthermore, the optimal performance of the battery module 30 becomes possible by adjusting the temperature of the battery module 30 by use of the chiller 60, and an overall travel distance of a vehicle may be increased by an efficient management of the battery module 30.

Furthermore, through the simplification of the entire system, a reduction in production cost and weight is possible, and space utilization may be improved.

In an exemplary embodiment of the present invention, a controller is connected to at least one of the elements including the first water pump 14, the second water pump 26 and the third water pump 33, the first valve V1, the second valve V2 and the refrigerant valve 70 of the heat pump system, to control the operations thereof. In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the system comprising:
   a first cooling apparatus that includes a first radiator and a first pump connected to each other by a first coolant line and is configured to circulate a coolant through the first coolant line to cool at least one electrical component and at least one motor mounted on the first coolant line;
   a second cooling apparatus that includes a second radiator and a second pump connected to each other by a second coolant line and is configured to circulate the coolant through the second coolant line;
   a battery module mounted in a battery coolant line selectively fluidically-connectable to the second coolant line through a first valve; and
   a chiller mounted in the battery coolant line to allow the coolant to pass through an interior of the chiller, connected to a refrigerant line of an air conditioner through a refrigerant connection line, and configured to adjust a coolant temperature by heat-exchanging a selectively received coolant with refrigerant supplied from the air conditioner,
   wherein a heat-exchanger mounted in the air conditioner is connected to the first and second coolant lines to receive the coolant circulating the first and second cooling apparatuses, and
   wherein the heat-exchanger is connected to first and second connection lines connected to the refrigerant line through a refrigerant valve to condense or evaporate the refrigerant through heat-exchanging with the coolant supplied through the first and second coolant lines so that a flow direction of the refrigerant is changed depending on at least one of a plurality of modes of the vehicle.

2. The heat pump system of claim 1, wherein the air conditioner includes:
   a heating, ventilation, and air conditioning (HVAC) module including a door, the HVAC module connected to the refrigerant line and configured to adjust an ambient air having passed through an evaporator to selectively flow into an internal condenser mounted on the refrigerant line depending on cooling, heating, and dehumidification modes in the plurality of modes of the vehicle;
   a compressor connected to the refrigerant line between the evaporator and the internal condenser;
   a first expansion valve mounted in the refrigerant line connecting the heat-exchanger and the evaporator;
   a second expansion valve mounted in the refrigerant connection line;
   a first bypass line connecting the heat-exchanger and the compressor through the refrigerant valve so that the refrigerant having passed through the heat-exchanger selectively flows into the compressor;
   a third expansion valve mounted in the refrigerant line between the internal condenser and the refrigerant valve; and
   a second bypass line including a first end portion connected to the refrigerant valve and a second end portion connected to the refrigerant line between the first expansion valve and the evaporator so that the refrigerant having passed through the heat-exchanger selectively flows into the evaporator.

3. The heat pump system of claim 2, wherein a first end portion of the first connection line is connected to the refrigerant valve, and a second end portion of the first connection line is connected to the heat-exchanger, at a side of the refrigerant valve.

4. The heat pump system of claim 2, wherein a first end portion of the second connection line is connected to the refrigerant valve, and a second end portion of the second connection line is connected to the refrigerant line connecting the evaporator and the heat-exchanger, at an opposite side of the refrigerant valve.

5. The heat pump system of claim 2, wherein a sub-condenser is mounted in the refrigerant line between the heat-exchanger and the evaporator.

6. The heat pump system of claim 5, wherein, when the heat-exchanger condenses the refrigerant, the sub-condenser additionally condenses the refrigerant condensed at the heat-exchanger through heat-exchanging with the ambient air.

7. The heat pump system of claim 2, wherein the second expansion valve is operated when the battery module is to be cooled by use of the coolant having exchanged heat with the refrigerant, so that the second expansion valve is configured to expand the refrigerant that flows through the refrigerant connection line and supplies the expanded refrigerant to the chiller.

8. The heat pump system of claim 2, wherein, in the heating mode and the heating and dehumidification modes of the vehicle, the third expansion valve selectively expands the refrigerant supplied from the internal condenser.

9. The heat pump system of claim 2,
   wherein the first valve is configured to selectively connect the second coolant line and the battery coolant line between the second radiator and the chiller;
   wherein the first cooling apparatus further includes a first branch line connected to the first coolant line between the first radiator and the first pump through a second valve mounted in the first coolant line between the first radiator and the first pump;
   wherein the battery coolant line includes a second branch line connecting the chiller and the battery module through the first valve; and wherein the second coolant line includes a third branch line separating the battery coolant line and the second coolant line.

10. The heat pump system of claim 2, wherein, in the cooling mode of the vehicle, in the air conditioner:
the refrigerant circulates through the refrigerant line while the first connection line is opened by operation of the refrigerant valve and the second connection line, and the first and second bypass lines are closed; and
the third expansion valve is configured to pass the refrigerant flowing into the refrigerant valve through the refrigerant line without expansion.

11. The heat pump system of claim 10, wherein
in the first and second cooling apparatuses, the coolant cooled at the first and second radiators is supplied to the heat-exchanger by operation of the first and second pumps; and
the heat-exchanger condenses the refrigerant through heat-exchanging with the coolant.

12. The heat pump system of claim 2, wherein, in the heating mode of the vehicle, in the air conditioner:
the second bypass line is closed while the second connection line and the first bypass line are opened by operation of the refrigerant valve;
the refrigerant line connecting the heat-exchanger and the evaporator is closed by operation of the first expansion valve;
the refrigerant having flowed from the internal condenser into the refrigerant valve is configured to pass through the heat-exchanger through the second connection line, and then flows into the compressor through the first connection line and the first bypass line interconnected by operation of the refrigerant valve; and
the third expansion valve is configured to expand the refrigerant flowing from the refrigerant valve into the heat-exchanger through the second connection line.

13. The heat pump system of claim 12,
wherein the first and second cooling apparatuses are configured to respectively supply the coolant to the heat-exchanger by operation of the first and second pumps; and
wherein the heat-exchanger evaporates the refrigerant through heat-exchanging with the coolant.

14. The heat pump system of claim 2, wherein, in the heating and dehumidification modes of the vehicle, in the air conditioner:
the second connection line, the first bypass line, and the second bypass line are configured to be opened by operation of the refrigerant valve;

the refrigerant line connecting the heat-exchanger and the evaporator is configured to be closed by operation of the first expansion valve;
the refrigerant having flowed from the internal condenser into the refrigerant valve flows into the heat-exchanger through the second connection line;
a part of the refrigerant of the refrigerant having passed through the heat-exchanger flows into the compressor through the first connection line and the first bypass line that are opened by operation of the refrigerant valve;
a remaining refrigerant of the refrigerant having passed through the heat-exchanger flows into the evaporator through the first connection line and the second bypass line that are open by operation of the refrigerant valve; and
the third expansion valve is configured to expand the refrigerant flowing from the refrigerant valve into the heat-exchanger through the second connection line.

15. The heat pump system of claim 14,
wherein the first and second cooling apparatuses are configured to respectively supply the coolant to the heat-exchanger by operation of the first and second pumps; and
wherein the heat-exchanger evaporates the refrigerant through heat-exchanging with the coolant.

16. The heat pump system of claim 2, wherein the second and third expansion valves are respectively an electronic expansion valve that controls flow movement of the refrigerant and selectively expands the refrigerant.

17. The heat pump system of claim 2, wherein the refrigerant valve is connected to the first and second connection lines, the refrigerant line, and the first and second bypass lines, and formed as a five-way valve controlling flow movement of the refrigerant.

18. The heat pump system of claim 2,
wherein a receiver dryer is mounted on the heat-exchanger on an opposite side of the refrigerant valve; and
wherein the receiver dryer separates gaseous refrigerant contained in the refrigerant having passed through the heat-exchanger, or the refrigerant flowing into the heat-exchanger through the second connection line.

19. The heat pump system of claim 1,
wherein the at least one electrical component includes at least one inverter and an on-board charger (OBC); and
wherein the at least one motor includes two motors corresponding to front and rear wheels of the vehicle.

* * * * *